E. D. FINLEY.
AIR BRAKE FOR RAILROAD TRAINS.
APPLICATION FILED AUG. 17, 1917.
1,276,048.
Patented Aug. 20, 1918.
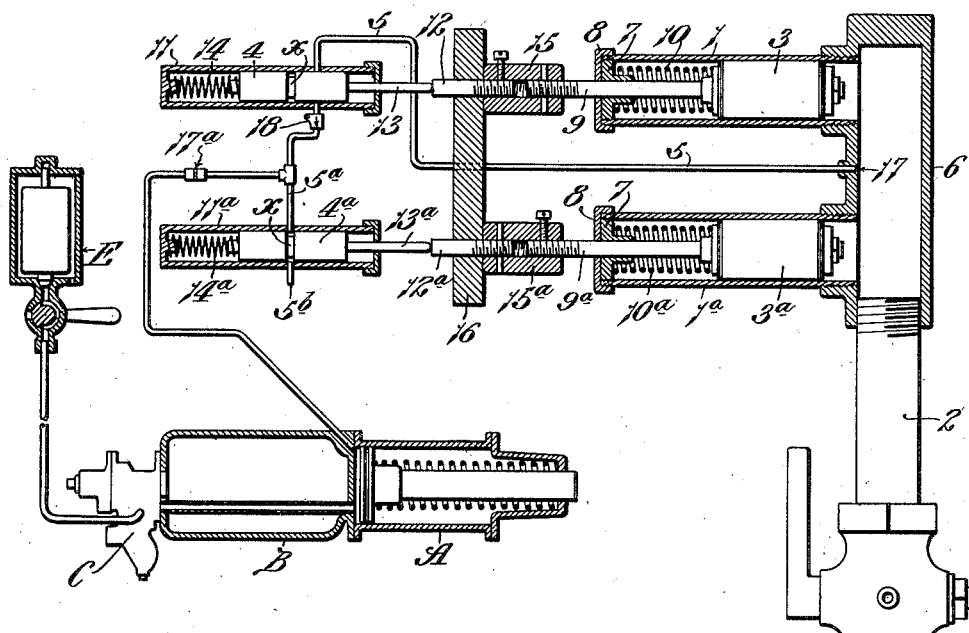
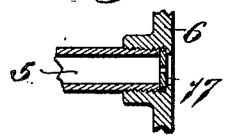

UNITED STATES PATENT OFFICE.

ERNEST D. FINLEY, OF LOUISIANA, MISSOURI, ASSIGNOR OF ONE-HALF TO FRANK W. BUFFUM, OF LOUISIANA, MISSOURI.

AIR-BRAKE FOR RAILROAD-TRAINS.

1,276,048.  Specification of Letters Patent.  Patented Aug. 20, 1918.

Application filed August 17, 1917. Serial No. 186,708.

*To all whom it may concern:*

Be it known that I, ERNEST D. FINLEY, a citizen of the United States, residing at Louisiana, Missouri, have invented a certain new and useful Improvement in Air-Brakes for Railroad-Trains, of which the following is a full, clear, and exact description, such as will enable others skilled in the art to which it appertains to make and use the same.

This invention relates to air brakes for railroad trains.

One objectionable feature of air brake systems of the kind now in general use is that if the triple valve sticks when the pressure in the train pipe is reduced to set the brakes, no air will be admitted to the brake cylinder, and consequently, the brakes will fail to operate. Likewise, if the triple valve sticks when the pressure in the train pipe is increased to release the brakes, the air cannot escape from the brake cylinder, and consequently, the brakes will remain set. The present air brake systems comprise manually-operable, pressure retaining valves which are adapted to be moved into an operative position by the brakeman so as to retain sufficient air in the brake cylinders to prevent the brakes from being fully released, it being the usual practice for the brakeman to set the pressure-retaining valve so as to slightly retard the movement of the train when it is traveling down a long grade. When the train reaches level track, the brakeman has to restore the pressure-retaining valves to their normal inoperative position, so as to permit the air to escape from the brake cylinders, and thus fully release the brakes. Consequently, in such a system if the brakeman fails to restore one or more of the pressure-retaining valves to their normal inoperative position, the brakes of the car or cars on which said pressure-retaining valves are mounted will remain partly set, thus impeding the movement of the train and causing great wear on the brake shoes.

One object of my invention is to provide an air brake system for railroad trains which is so constructed that the brakes will operate even if the triple valve sticks or fails to operate when the pressure in the train pipe is reduced, and will be released even if the triple valve sticks or fails to operate when the pressure in the train pipe is increased.

Another object is to provide an air brake system of the character just described which is so constructed that failure of the brakeman to restore the pressure-retaining valve to its normal inoperative position will not result in the brakes controlled by said valve remaining partially set.

And still another object of my invention is to provide an attachment for air brake systems of the kind now in general use which overcomes the principal objectionable features of such systems previously pointed out.

To this end I have devised an air brake system which comprises means for causing air to pass from the train pipe into the brake cylinder when the pressure in the train pipe is reduced under ordinary operating conditions to set the brakes, even though the triple valve sticks or fails to operate, thereby causing the brakes to be set. Said system also comprises means for permitting air to escape from the brake cylinder when the pressure in the train pipe is increased, even though the triple valve sticks or fails to operate. Various means can be used for carrying out my invention, but the means that I prefer to use for effecting the admission of air from the train pipe into the brake cylinder, when the pressure in the train pipe is reduced, consists of a spring-pressed piston arranged in a cylinder that communicates with the train pipe and a valve governed by said piston and arranged so that it controls the passage of air through an air line which leads from the train pipe to the brake cylinder. When the pressure in the train pipe is reduced to a certain degree, said piston will move under the influence of its spring, and thus permit the valve governed by same to move into such a position that air can pass from the train pipe into the brake cylinder, and thus operate the brakes. The means that governs the discharge of the air from the brake cylinder, when the pressure in the train pipe is increased, also consists of a spring-pressed piston arranged in a cylinder that communicates with the train pipe and a valve controlled by said piston and constructed in such a manner that it will open, and thus permit the air to escape from the brake cylinder whenever the pressure in the train pipe is increased to release the brakes, thereby insuring the release of the brakes, even though the triple valve sticks or fails to operate.

Figure 1 of the drawings is a horizontal sectional view, illustrating an air brake system constructed in accordance with my invention; and Figs. 2 and 3 are detail sectional views of the air line, illustrating the restrictions that are preferably arranged in said air line between the train pipe and the brake cylinder.

I have herein illustrated my invention embodied in an air brake system of the kind now in general use which comprises a brake cylinder A, an auxiliary air tank B and a triple valve C which causes air to pass from said air tank into the brake cylinder, and thus operate the brakes whenever the pressure in the train pipe D is reduced under ordinary operating conditions, and also causes air to escape from said brake cylinder whenever the pressure in the train pipe is increased, said system also comprising a pressure retaining valve E that is adapted to be operated by the brakeman so as to retain sufficient pressure in the brake cylinder to hold the brakes partially set, as, for example, when the train is traveling down a long grade. The elements above referred to are of well known construction and form no part of my present invention. My invention consists in an air brake system, which, in addition to the elements above mentioned, comprises two cylinders 1 and $1^a$ that communicate with an extension 2 of the train pipe, spring-pressed pistons 3 and $3^a$ arranged in the cylinders 1 and $1^a$, respectively, a valve 4 controlled by the piston 3 for governing the passage of air through the air line 5 that leads from the extension 2 of the train pipe to the brake cylinder A, and the valve $4^a$ controlled by the piston $3^a$ for governing the escape of air from the brake cylinder to the atmosphere. The cylinders, pistons and valves just referred to may be of any preferred construction, but I prefer to use piston type valves which move in one direction under the influence of springs when the pressure in the train pipe is reduced, and move in the opposite direction under the influence of the pistons that control same when the pressure in the train pipe is increased.

In the form of my invention herein illustrated the cylinders 1 and $1^a$ are both mounted on a casting 6 that forms one end of said cylinders, said casting being carried by the extension 2 of the train pipe. The opposite end of each of said cylinders is closed by a plug 7 that is screwed into same and a cap piece 8 screwed onto the end of the cylinder and threaded oppositely to the plug 7, so as to lock said plug in operative position. The pistons 3 and $3^a$ are provided with piston rods 9 and $9^a$, respectively, that project outwardly through the ends of said cylinders, and springs 10 and $10^a$ are combined with said pistons so as to move them in one direction, to the right, looking at Fig. 1, when the pressure in the train pipe D drops below a certain degree. The valves 4 and $4^a$ are piston type valves which are reciprocatingly mounted in cylinders 11 and $11^a$, respectively, said valves being moved in one direction, to the left, looking at Fig. 1, by means of adjustable extensions 12 and $12^a$ on the piston rods 9 and $9^a$, respectively, that bear against the ends of piston rods 13 and $13^a$, respectively, on said valves. The valves 4 and $4^a$ are moved in the opposite direction by means of springs 14 and $14^a$ which are interposed between the valves 4 and $4^a$, respectively, and the ends of the cylinders in which said valves are mounted. The adjustable extensions 12 and $12^a$ on the pistons 3 and $3^a$, respectively, are preferably formed by short rods that are screwed into abutment blocks 15 and $15^a$ on the piston rods 9 and $9^a$, respectively, said abutment blocks normally bearing against a stationary abutment 16, as shown in Fig. 1, when the train is running along with the brakes released. The abutment blocks can either be permanently connected to the piston rods that carry same and the extensions on said blocks adjustably connected thereto, or vice versa, the purpose of providing the piston rods 9 and $9^a$ with adjustable extensions being to facilitate the adjustment of the valves 4 and $4^a$. The air line 5, previously referred to, leads from the casting 6 to one side of the cylinder 11, and thence from the opposite side of said cylinder to the brake cylinder A. An extension $5^a$ that is tapped onto the air line 5 at a point between the brake cylinder and the cylinder of the valve 4, leads to one side of the cylinder $11^a$, and an outlet pipe $5^b$ leads from the opposite side of said cylinder $11^a$. The valves 4 and $4^a$ are each provided with an annular groove $x$ so that when the groove $x$ in the valve 4 registers with the air line 5, air can flow through said line from the train pipe and enter the brake cylinder, and when the groove $x$ in the valve $4^a$ registers with the extension $5^a$ of the air air line and the outlet pipe $5^b$, air can escape from the brake cylinder to the atmosphere. The air line that I prefer to use for conducting the air from the train pipe into the brake cylinder is of small cross-sectional area, preferably a one-eighth inch pipe, and in order to prevent the air from rushing into the brake cylinder or escaping from said brake cylinder quickly, I have provided the air line 5 with two restrictions formed conveniently by perforated diaphragms or baffles that are arranged in the air line 5, as shown in Figs. 2 and 3. One of said restrictions, which I have designated by the reference character 17, is arranged in the air line 5 in proximity to the point where said air line is connected to the casting 6, and the other restriction, which I have designated by the reference character 17ª, is arranged in said air line at a point between the brake cylinder and the extension 5ª of said air line through which the air escapes to the atmosphere. I also prefer to arrange a check valve 18 in the air line 5 in proximity to the point where said air line leads away from the cylinder 11, so as to hold the brakes set by preventing the air in the brake cylinder from escaping back through the air line 5 and entering the train pipe when the pressure in the train pipe becomes abnormally reduced, as, for example, in case of an emergency stop, or when the train pipe breaks. While I have herein illustrated the cylinders 1 and 1ª as being substantially the same size as the brake cylinder, in actual practice the cylinders 1 and 1ª are comparatively small, as are also the valves 4 and 4ª and the various parts that coöperate with said elements.

When the train is running along under normal conditions the parts previously described occupy the position shown in Fig. 1. When the engineer desires to stop the train he reduces the pressure in the air pipe D, thereby causing air to be admitted from the auxiliary air tank B into the brake cylinder A, if the triple valve C operates properly or does not stick. Irrespective of whether or not the triple valve C operates properly, air will pass from the extension 2 of the train pipe through the air line 5 and enter the brake cylinder A whenever the pressure in the train pipe drops to a certain degree, for example, sixty pounds, owing to the fact that the reduction of pressure in the train pipe permits the pistons 3 and 3ª to move to the right under the influence of their springs, thus causing the valve 4 to open by the annular groove $x$ in same moving into registration with the air line 5 and the valve 4ª to close by the annular groove $x$ in same moving out of registration with the extension 5ª of said air line.

From the foregoing it will be seen that in my improved air brake system there is no possibility of the brakes failing to operate in case the triple valve sticks, because said system comprises means for causing air to pass from the train pipe directly into the brake cylinder whenever the pressure in the train pipe is reduced sufficiently, under ordinary operating conditions, to set the brakes. When the engineer desires to release the brakes he increases the pressure in the train pipe D to normal, which is usually ninety pounds, thereby causing the air which had previously been admitted to the brake cylinder to escape therefrom, if the triple valve C operates properly. Failure of the triple valve C to operate properly, however, does not result in the brakes remaining set, because whenever the pressure in the train pipe D is restored to normal, the pistons 3 and 3ª will move to the left under the influence of the pressure in the train pipe, thus causing the valve 4 to close and the valve 4ª to open, the air escaping from the brake cylinder through the air line 5, the extension 5ª of said air line and the groove $x$ in the valve 4ª which is then in registration with said extension and the outlet pipe 5ᵇ. In addition to the desirable features above pointed out, my improved air brake system eliminates the possibility of the brakes dragging or remaining partially set, in case the brakeman fails to restore the pressure-retaining valve to its normal position after the train has traveled down a grade, owing to the fact that when the pressure in the train pipe D is normal, the valve 4ª will occupy such a position that one end of the brake cylinder is in direct communication with the atmosphere through the air line 5, the extension 5ª of same, the groove $x$ in the valve 4ª and the outlet valve 5ᵇ.

Having thus described my invention, what I claim, and desire to secure by Letters Patent, is:

1. An air brake system for railroad trains, comprising a train pipe, a brake cylinder, a device for causing air to be admitted to said brake cylinder to set the brakes when the pressure in the train pipe is reduced, and an automatically operating means separate and distinct from said device for causing air to pass from the train pipe into the brake cylinder whenever the pressure in the train pipe is reduced so as to insure the operation of the brakes in case said device fails to operate properly.

2. An air brake system for railroad trains, comprising a brake cylinder, train pipe, a device for causing air to be admitted to said cylinder to set the brakes when the pressure in the train pipe is decreased and to permit air to escape from the brake cylinder so as to release the brakes when the pressure in the train pipe is increased, and an automatically operating means separate and distinct from said device for causing air to pass from the train pipe into the brake cylinder when the pressure in the train pipe is decreased below a certain degree under ordinary operating conditions and to permit air to escape from the brake cylinder when the pressure in the train pipe is increased, thereby insuring setting of the brakes or release of the brakes in case said device fails to operate properly.

3. An air brake system for railroad trains, comprising a brake cylinder, a train pipe, and two separate and distinct means for causing air to be admitted to the brake cylinder when the pressure in the train pipe is reduced under ordinary operating conditions to set the brakes, one of said means being governed by the pressure in the train pipe and so constructed that it operates automatically.

4. An air brake system for railroad trains, comprising a brake cylinder, a train pipe, an auxiliary air tank, a triple valve for causing air to pass from said tank into the brake cylinder when the pressure in the train pipe is reduced and for permitting air to escape from the brake cylinder when the pressure in the train pipe is increased to set the brakes, and a separate and distinct automatically-operating means governed by the pressure in the train pipe for admitting air from the train pipe to the brake cylinder when the pressure in the train pipe is decreased under ordinary operating conditions and for permitting air to escape from the brake cylinder to the atmosphere when the pressure in the train pipe is increased under ordinary operating conditions.

5. An air brake system for railroad trains, comprising a triple valve that governs the admission and exhaust of the air from the brake cylinder, and automatically-operating means separate and distinct from said triple valve for causing the brakes to act if the triple valve fails to operate when the pressure in the train pipe is reduced under ordinary operating conditions and for causing the brakes to be released if the triple valve fails to act when the pressure in the train pipe is increased under ordinary operating conditions.

6. An attachment for air brake systems, comprising automatically-operating means governed by the pressure of the air in the train pipe for causing air to pass from the train pipe into the brake cylinder when the pressure in the train pipe is decreased under ordinary operating conditions to set the brakes and for causing air to escape from the brake cylinder so as to release the brakes when the pressure in the train pipe is increased.

7. An attachment for air brake systems, comprising an air line leading from the train pipe to the brake cylinder, a valve for governing the passage of air through said line into the brake cylinder, and an automatically-operating means governed by the pressure in the train pipe for controlling the operation of said valve when the pressure in the train pipe is increased under ordinary operating conditions.

8. An attachment for air brake systems, comprising two automatically-operating means governed by the pressure in the train pipe for admitting air to the brake cylinder when the pressure in the train pipe is reduced under ordinary operating conditions and for permitting air to escape from the brake cylinder when the pressure in the train pipe is increased under ordinary operating conditions.

9. An air brake system, comprising a brake cylinder, a train pipe, an air line leading from said train pipe to said cylinder, a branch leading from said air line to the atmosphere, an admission valve in said air line, an exhaust valve in said branch, and means governed by the pressure in the train pipe for controlling the operation of said valves.

10. An air brake system, comprising a brake cylinder, a train pipe, an air line leading from said train pipe to said cylinder, a branch leading from said air line to the atmosphere, an admission valve in said air line, an exhaust valve in said branch, means governed by the pressure in the train pipe for controlling the operation of said valves, and a check valve in said air line for preventing the air in the brake cylinder from backing up into the train pipe when said admission valve is open.

11. An air brake system, comprising a brake cylinder, an inlet valve, which, when in its open position, permits air to pass from the train pipe into the brake cylinder, an outlet valve, which, when in its open position, establishes communication between the brake cylinder and the atmosphere, and means governed by the pressure in the train pipe for holding said inlet valve closed and said outlet valve open when the brakes of the system are released or not in service.

12. An air brake system, comprising a brake cylinder, a train pipe, an air line leading from said train pipe to said brake cylinder, a normally closed valve that governs the passage of air through said air line into the brake cylinder, and a cylinder communicating with the train pipe and provided with a piston that governs the operation of said valve.

13. An air brake system, comprising a brake cylinder, a train pipe, an air line leading from said train pipe to said brake cylinder, a normally closed valve that governs the passage of air through said air line into the brake cylinder, a cylinder communicating with the train pipe and provided with a piston that governs the operation of said valve, and an adjustable means for transmitting movement from said piston to said valve.

14. An air brake system, comprising a brake cylinder, a train pipe, an air line leading from said train pipe to said brake cylinder, a valve that normally prevents the air from passing through said air line, a spring for moving said valve in one direction, and means under the influence of the air in the train pipe for moving said valve in the opposite direction.

15. An air brake system, comprising a brake cylinder, a train pipe, an air line leading from said train pipe to said brake cylinder and provided with a branch that leads to the atmosphere, a normally closed admission valve that governs the passage of the air through said air line, a normally open exhaust valve that governs the discharge of air through said branch, and cylinders communicating with the train pipe and provided with spring-pressed devices that govern the operation of said valves.

16. An air brake system, comprising a brake cylinder, a train pipe, an air line leading from said train pipe to said brake cylinder and provided with a branch that leads to the atmosphere, a normally closed admission valve that governs the passage of the air through said air line, a normally open exhaust valve that governs the discharge of air through said branch, cylinders communicating with the train pipe and provided with spring-pressed devices that govern the operation of said valves, a check valve in said air line for preventing the air from backing up through said air line from the brake cylinder into the train pipe when the admission valve is open, and adjustable means for regulating said valves with reference to the pistons that control the operation of same.

17. An air brake system, comprising a brake cylinder, an auxiliary air tank, a train pipe, a triple valve, a pressure-retaining valve, a normally closed valve governed by the pressure in the train pipe for permitting air to pass from the train pipe into the brake cylinder when the pressure in the train pipe is reduced, and a normally open valve governed by the pressure in the train pipe for permitting air to escape from the brake cylinder when the pressure in the train pipe is increased to release the brakes.

18. An air brake system, comprising a brake cylinder, an auxiliary air tank, a train pipe, a device that is adapted to be rendered operative by the reduction of air in the train pipe for permitting air to pass from said tank into the brake cylinder and also rendered operative by the increase of the pressure of the air in the train pipe for permitting air to escape from the brake cylinder, a pressure-retaining valve, an air line leading from the train pipe to the brake cylinder and provided with a branch that leads to the atmosphere, a spring-pressed admission valve in said branch, and cylinders communicating with said train pipe and provided with means that govern the operation of said admission valve and said discharge valve.

ERNEST D. FINLEY.